United States Patent [19]

Gill et al.

[11] Patent Number: 5,090,032
[45] Date of Patent: Feb. 18, 1992

[54] MOVABLE PRESSURE SPRING BAND TO AVOID EXCESSIVE WEAR FROM CARD FEEDING APPARATUS

[75] Inventors: Hugh Gill, Livingston; Mark McCorry, Glasgow, both of United Kingdom

[73] Assignee: Unisys, Blue Bell, Pa.

[21] Appl. No.: 537,801

[22] Filed: Jun. 14, 1990

[30] Foreign Application Priority Data

Nov. 24, 1989 [GB] United Kingdom ............... 8926636

[51] Int. Cl.⁵ .................... G06M 7/06; G06M 3/02
[52] U.S. Cl. .................................. 377/18; 377/8; 377/16; 271/274
[58] Field of Search ............... 377/8, 15, 16, 17, 18; 271/272, 273, 274

[56] References Cited

U.S. PATENT DOCUMENTS

| | | | |
|---|---|---|---|
| 3,702,925 | 11/1972 | Anderson et al. | 377/8 |
| 3,737,666 | 6/1973 | Dutro | 377/8 |
| 3,756,589 | 9/1973 | Carbine | 271/274 |
| 4,163,550 | 8/1979 | Armstrong | 271/274 |
| 4,534,550 | 8/1985 | Reist | 271/272 |

Primary Examiner—John S. Heyman
Attorney, Agent, or Firm—Whitham & Marhoefer

[57] ABSTRACT

A pressure spring for urging a document (10) against a reading head (22) in a document processing machine, comprises a resilient band (46) on band support arms (50) with different portions of the discontinuous resilient band (46) being selected to lie between the support arms (50). Manually operable means (80), (70) can be provided. In one embodiment, a motor (84) under the action of a controller (106), automatically advances the discontinuous band (46) whenever a service date or a pre-determined document count has been exceeded. Should the discontinuous resilient band (46) reach an extremity of travel, the controller (106) provides that the motor (84) returns the discontinuous resilient band (46) back to its start position.

8 Claims, 5 Drawing Sheets

MOVABLE PRESSURE SPRING BAND TO AVOID EXCESSIVE WEAR FROM CARD FEEDING APPARATUS

The present invention relates to an apparatus for urging a document against a reading head. It particularly relates to such an apparatus employing a resilient spring to ensure intimate contact of a moving document against a reading head.

In document reading and cheque encoding machines it is known to read characters from a document. Characters are printed in optically readable form or using magnetic ink. The document is moved, along a track, to engage a document reading head. A pressure spring is used to urge the document into intimate contact with the reading head. Characters, printed on the document, are turned into a sequence of signals by the head which are interpreted by a control processor for use in automatic data processing.

Document encoding machines process many hundreds of thousands of documents during their working lives. Some specifications call for millions of documents to be processed before the pressure spring, urging the document against the reading head, should be serviced or replaced. It is essential, especially when reading magnetic characters, that intimate contact between the document and the head be maintained. It has been the custom, in the prior art, to provide a cantilever spring, supported on a block, proximate to and on the other side of the document from the head, bowed to press against the document and urge it against the head. The cantilever spring rapidly wears out under the attrition of passing documents. Unless the material of the spring is very carefully selected, the pressure is very carefully controlled, and the surface characteristics of the documents are not unduly rough, the pressure spring, as provided by the prior art, rapidly wears out. It is not unknown, under heavy service, for the pressure spring to last only 10 percent of its specified service life. An engineer call-out to service one, minor item in a document processing machine is expensive and costly. The precise design and adjustment of a long-lasting pressure spring, according to the prior art, is time consuming and sometimes impossible. Accordingly, the present invention seeks to provide a pressure spring which includes reliability in operation and long life. The present invention also seeks to extend the service period for pressure springs beyond that already specified with confidence in being able to achieve the specification.

The present invention consists in an apparatus for urging a document against a reading head, said apparatus comprising: a band support; a moveable resilient band, said band including a plurality of spaced portions along the length thereof, a selected portion being held on said support; and positioning means, operable to position said band to select which portion of said band is said selected portion; said selected portion being operative to urge a document towards the reading head.

In the prior art, the cantilever pressure spring provided uncertain pressure of the document against the head. Its parameters were loosely controlled and pressure could vary wildly. In order to overcome this uncertainty in document pressure, the present invention further comprises a pair of spaced arms, the selected portion of the band being held there-between. By defining the span of the selected portion, pressure of the document against the head is far better controlled than in the prior art.

The present invention provides that the positioning means can be manually operable. It also provides that the band can be an endless band.

In another embodiment, the present invention provides that the positioning means includes a motor for moving the band.

In order to prolong the life of the band, another aspect of the invention provides that the band comprises a first end and a second end; provides that the positioning means is operative to take portions, in succession, from said first end to said second end as said selected portion; provides that the apparatus further comprises sensing means, operative to detect when said second end has been reached and to signal the positioning means to cause the positioning means to move the band for the selected portion to be once again proximate to the first end. In this way, by recycling from one end to the other as the band progresses through its selected portions and length, wear is distributed.

It is frequently specified that a pressure spring be changed after a pre-determined number of documents have passed by the pressure spring. In the prior art, this required a service engineer to call or skilled personnel, on site, to perform a service operation. In order to obviate this inconvenience and cost, the present invention provides that, in addition to all those previous features where the positioning means includes a motor, that there is also provided counting means, operative to count the number of documents which have been engaged by the apparatus and operative to command the positioning means to select a fresh portion of the band whenever a pre-determined number of documents has been exceeded since last selection of a fresh portion.

It is further a specification, with the prior art, that a pressure spring be changed at pre-determined intervals. For example, a pressure spring may be changed every three months, regardless of the number of documents which have been processed. Once again, this requires skilled personnel and the possible intervention, at great cost, of a field engineer. To overcome this problem, the present invention further provides that, in addition to all those features recited where the positioning means requires a motor, there is provided a controller, operative to calculate the number of days since last selection of a portion of the band and to command the positioning means to select a fresh portion on the band whenever the lapsed time exceeds more than a pre-determined number of days.

For preference, the motor is a stepping motor and the band is of resilient metal. Also for preference, where the band is not endless, it comprises at either end thickened and strengthened end portions, perforated to accept a joining spring causing tension therein.

Where the band is manually adjustable, in a first embodiment, the ends of the band are joined back upon themselves and pass about a guide, manual adjustment being achieved by moving the position of the band ends on the guide. In a second embodiment where the band is manually positionable, an indicator knob, on a shaft, employed to move a rack and pinion drive. The present invention is further explained, by way of an example, by the following description, taken in conjunction with the appended drawings, in which.

Figure 1:
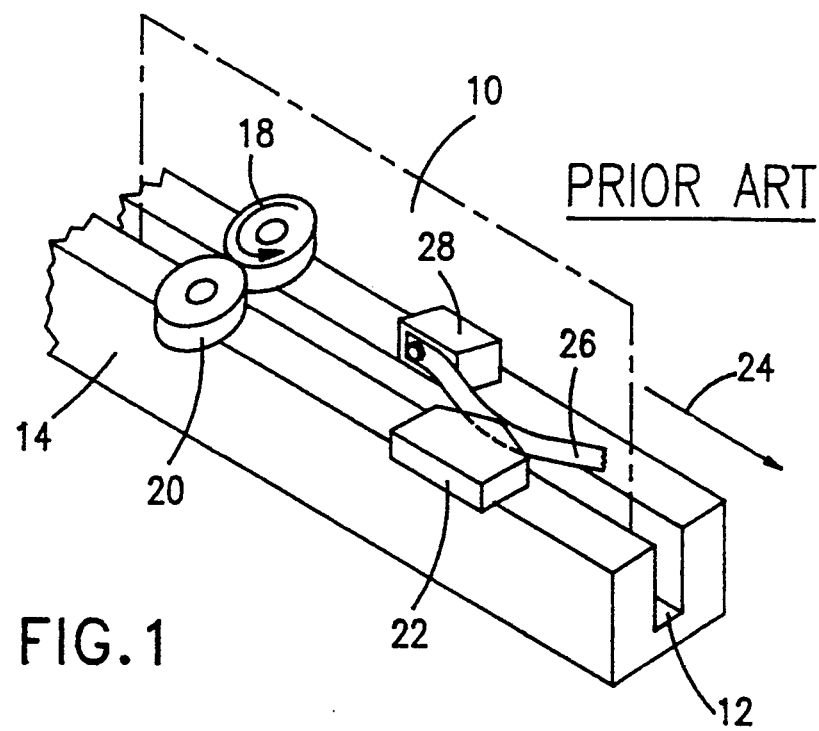
FIG. 1 is a projected view of a document track suitable for use with the present invention and illustrates the prior art use of a cantilever pressure spring.

FIG. 1 exemplifies the environment wherein the present invention is used. A document 10, shown in phantom outline, moves in a slot 12 in a document track 14 urged by the rotation of a driven wheel 16, as illustrated by a first arrow 18 and opposed by an idler wheel 20. The document 10 is moved past a magnetic reading head 22, as indicated by a second arrow 24. A prior art cantilever spring arm 26 is illustrated urging the document 10 against the magnetic head 22 so that characters, printed on the document, (not here shown) may be turned into signals by the magnetic head 22 for interpretation. The cantilever spring arm 26 is generally held on the document track 14 and is bowed to press against the magnetic reading head. Those skilled in the art will appreciate that such a device is difficult to adjust and of uncertain wear characteristics. The spring arm 26 and its associated support 28 are those items which the present invention seeks to improve and replace.

Figure 2:
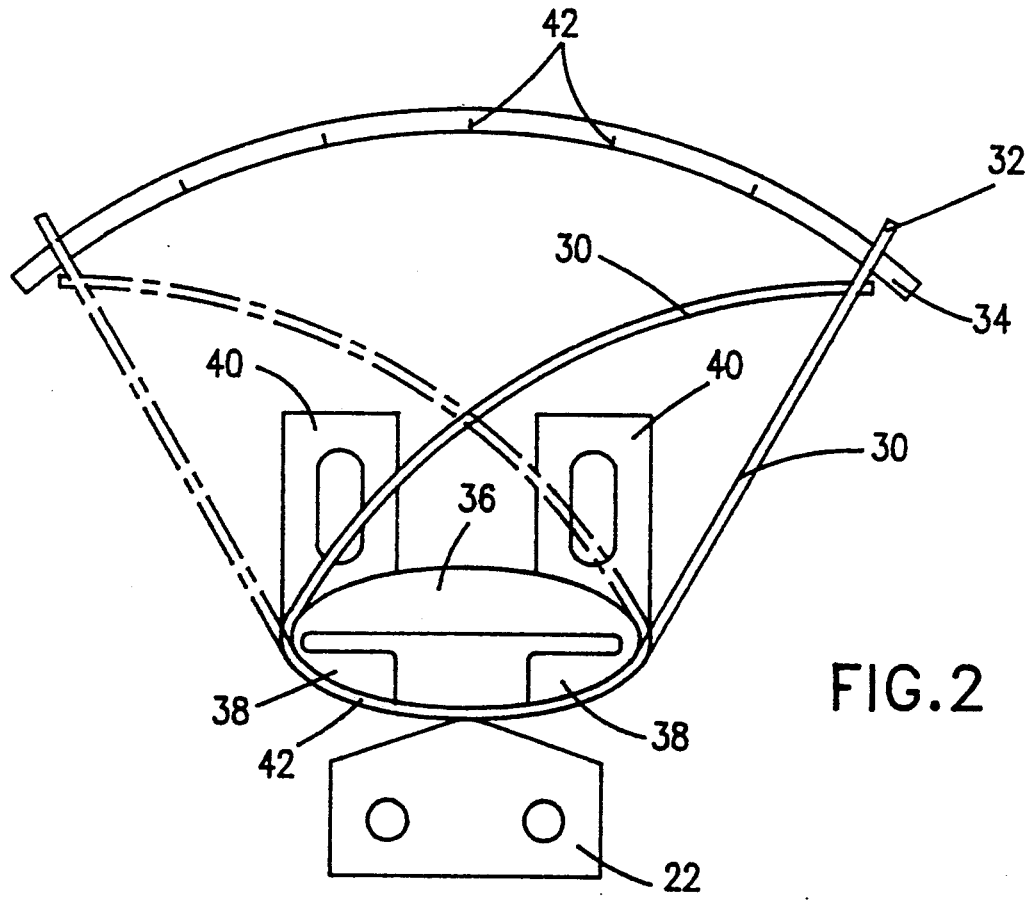
FIG. 2 is a plan view of a first embodiment of the present invention where a resilient band is manually positionable.

FIG. 2 is a plan view of a first, manually adjustable embodiment of the present invention. A resilient band 30 is joined to itself at its ends and a positionable end 32 can be penetrated by or simply rest upon a guide 34 of generally arcuate form. The resilient band 30 passes around a band support 36 comprising a pair of spaced arms 38 proximate to the magnetic head 22. Screw lugs 40 serve to attach the band support 36 with respect to the document track 14.

The band support 36 comprises a number of notches or graduations 42 whereat the positionable end 32 of the resilient band 30 may be stopped. The positionable end 32 may be moved to each graduation 42 in turn until an extreme position, shown in broken outline, is achieved for the resilient band 30. At periodic intervals, or when a pre-determined number of documents have been processed, a fresh graduation 42 can be selected. In this way, the pressure spring, in the form of the resilient band 30, is readily renewed without skilled intervention. The presence of the spaced arms 38 on the band support 36 permits control of the pressure exerted by the selected portion 44 of the resilient band 30 therebetween. The uncertainties of the prior art spring 26 are thus overcome and extended service life is achieved.

Figure 3:
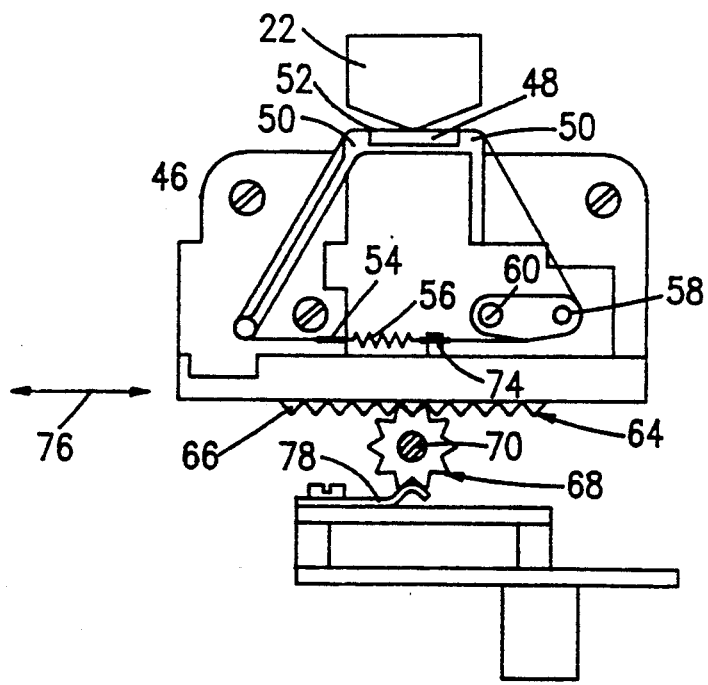
FIG. 3 is a view, from beneath, of a second embodiment of the present invention wherein the band is manually positionable.
Figure 4:
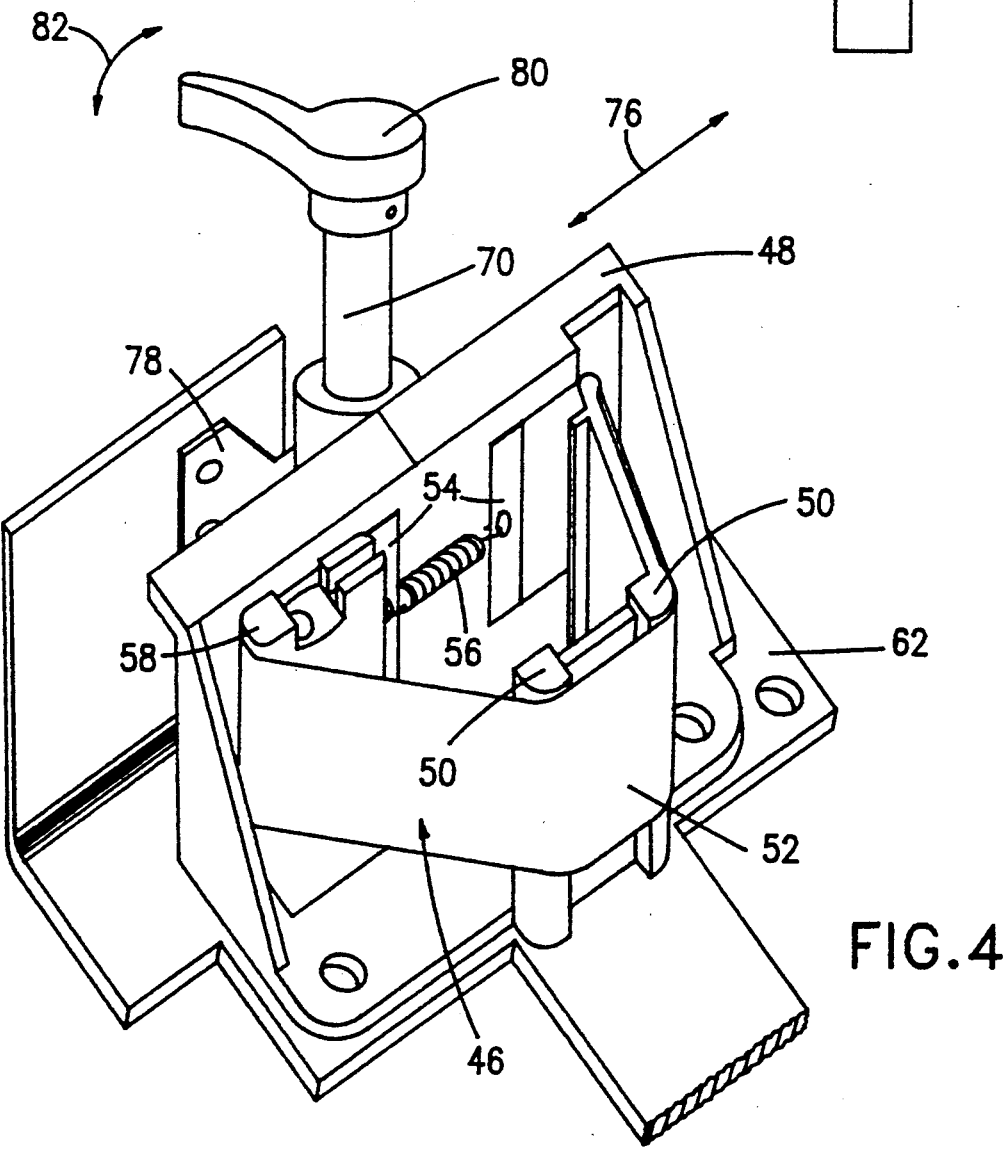
FIG. 4 is a projected view of the assembled apparatus of FIG. 3.
Figure 5:
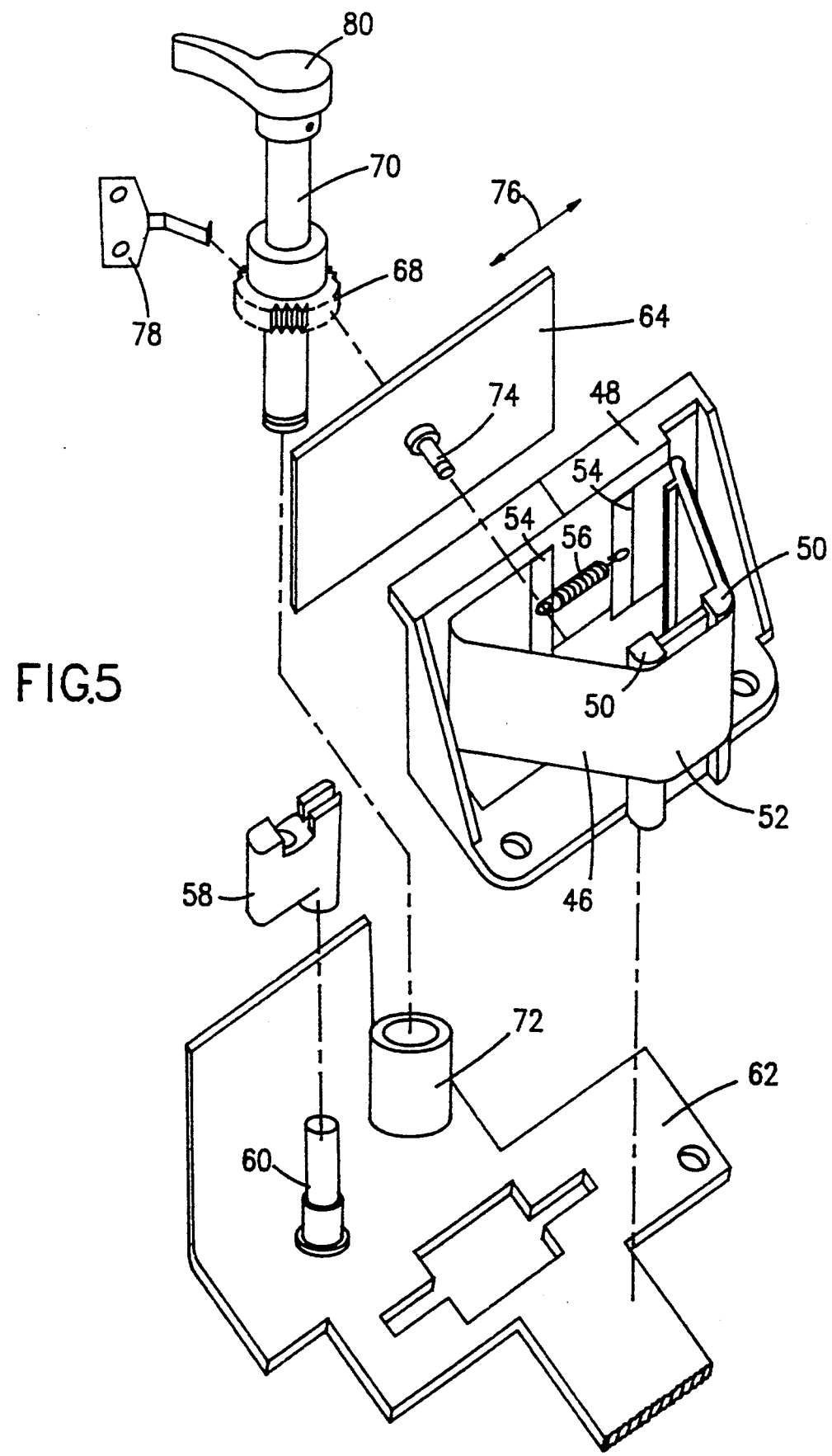
FIG. 5 is an exploded view of the apparatus otherwise shown in FIGS. 3 and 4.

FIGS. 3, 4 and 5 together show a second embodiment of the present invention wherein the band is manually positionable. FIG. 3 shows a view from beneath the track of FIG. 1, with the embodiment of FIGS. 3, 4 and 5 in place of the prior art spring 26 and its supports 28. FIG. 4 shows an assembled view and FIG. 5 an exploded view of the second embodiment.

A discontinuous resilient band 46 passes round a band support block 48, having spaced band support arms 50 supporting a selected portion 52 of the discontinuous resilient band 46. The discontinuous resilient band 46 comprises first and second strengthened ends 54 of thicker cross-section, perforated each to accept a respective end of a helical tension spring 56 which pulls the two ends 54 towards one another to maintain tension in the discontinuous resilient band 46. A sprung tension arm 58, within the compass of the discontinuous resilient band 46, and supported on a tension arm pillar 60 on a base plate 62 cooperates with the helical tension spring 56 to maintain tension in the discontinuous resilient band 46.

A backing plate 64 has, on its side remote from any document, a rack gear 66 controlled by a pinion gear wheel 68 on a pinion shaft 70 held on a pinion shaft bearing 72 on the base plate 62. The backing plate 64, on its surface closest to any document, comprises a drive pin 74 which engages one of the ends 54 of the discontinuous resilient band 46 so that rotation of the pinion shaft 70, causing movement of the rack gear 66, moves the discontinuous resilient band 46 from side to side as indicated by a third arrow 76.

A cantilever retainer spring 78 bears against the pinion gear wheel 68 to retain the pinion shaft 70 in any position where it is left. An indicator knob 80 is attached to control the position of the pinion shaft 70. A fourth arrow 82 illustrates the range of movement of the indicator knob 80.

Whenever enough documents have been processed to cause selection of a further selected portion 52 of the discontinuous resilient band 46, or whenever a service interval is indicated by the elapse of time, all that is required for the operator is to move the indicator knob 80 through a selected number of clicks on the cantilever retainer spring 78. A fresh portion 52 of the discontinuous resilient band 46 is thus selected. Once again, the band support arms 50 support and control resilience of the material of the discontinuous resilient band 46 as it urges a document against the head 22. The band support block 48 of FIGS. 3, 4 and 5 generally corresponds to the band support 36 of FIG. 2 and the spaced arms 38 of FIG. 2 generally correspond to the band support arms 50 of FIGS. 3, 4 and 5.

Figure 6:
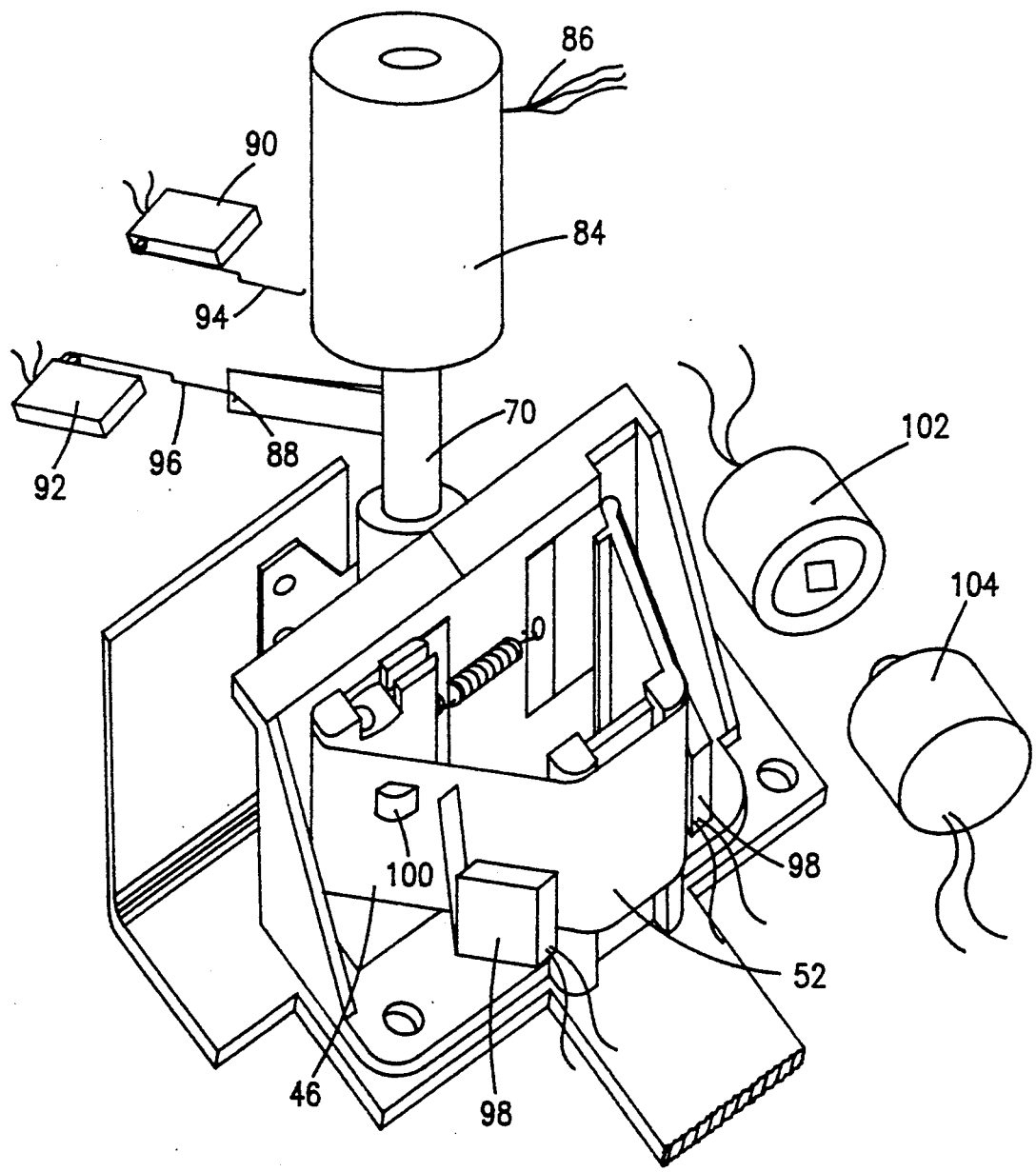
FIG. 6 shows a further embodiment of the invention where the band is positioned by a motor.

FIG. 6 shows a third embodiment of the present invention. The apparatus of FIGS. 3, 4 and 5 has the indicator knob 80 replaced by a positioning motor 84 driven by motor wires 86. The pinion shaft 70 is provided with a pinion shaft flag 88 which, at extremes of rotation of the pinion shaft 70, engages either a first microswitch 90 or a second microswitch 92. When a first microswitch arm 94 is depressed by the pinion shaft flag 88, it indicates that the discontinuous resilient band 46 is at a first extreme position, and when a second microswitch arm 96 is engaged by the pinion shaft flag 88, it indicates that the discontinuous resilient band 46 is at the opposite extreme position.

As an alternative to use of the pinion shaft flag 88, base plate mounted microswitches 98 may engage raised tabs or bosses 100 on the discontinuous resilient band 46 as it progresses from one extreme position to another.

A light source 102 shines a beam of light across the path of an advancing document 10 towards a photosensor 104. Whenever a document 10 passes between the light source 102 and the photosensor 104, the light beam is interrupted and the presence of a document 10 is detected.

For preference, the positioning motor is a stepping motor operative to adopt and maintain a position whereto it has been stepped. Alternatively, the motor 84 can comprise a DC motor and a gearbox, and any other means for sensing and/or detenting its position known in the art. In particular, the cantilever retainer spring 78 (not shown in FIG. 6) can serve just such a purpose.

Figure 7:
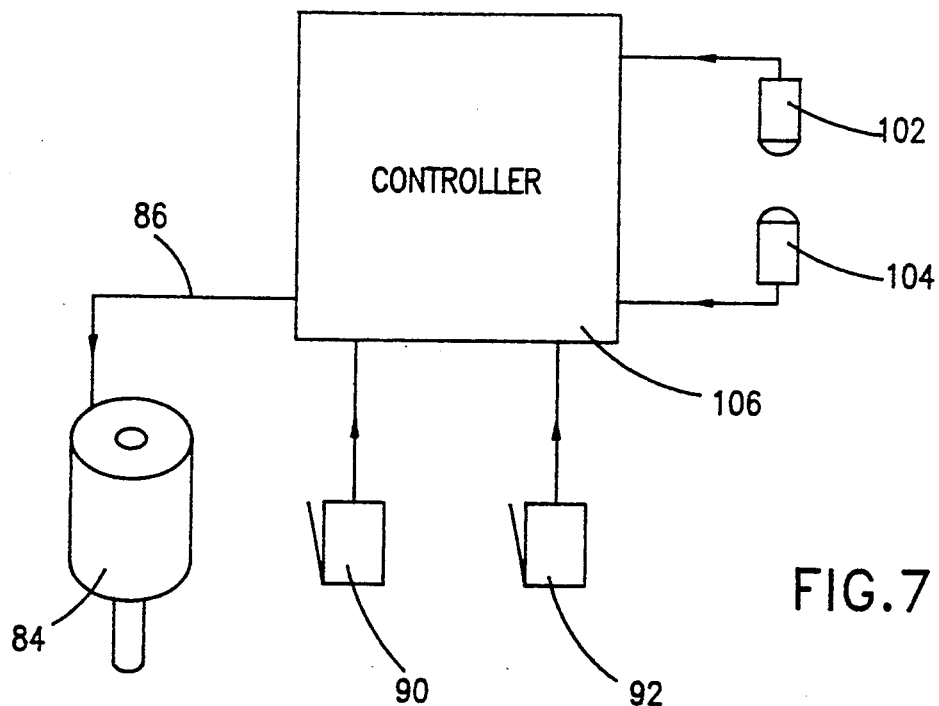
FIG. 7 is a schematic block diagram of the control system for use with the apparatus of FIG. 6.

FIG. 7 shows a schematic diagram of the control system suitable for use with the embodiment of FIG. 6. A controller 106 is used to control the document encoding machine. In addition to all of its other duties in deciphering characters detected by the magnetic head, driving document moving wheels 16 and retaining, manipulating and processing data, the controller 106 also serves to select the position of the discontinuous resilient band 46. The controller, as is well-known in the art, will comprise some form of data processor together with a variety of ancillary boards and devices for driving signals to and receiving signals from controlled devices and communication systems. The controller 106 comprises non-volatile memory both in the form of maintained RAM and in the form of disc storage. Between periods of being switched off and switched on, the controller 106 recollects its previous state. Those familiar with use of small computers and operating systems will be familiar with the ability of a switched-off system to know, upon switch on, the date and time and to recollect, if required, any previously undertaken and incompleted task.

The controller 106 provides power to illuminate the light source 102 and is further coupled to the photosensor 104 to detect and count each document 10 as it passes between the photosensor 104 and the light source 102. The controller 106 maintains a running count, from day to day, of the number of documents 10 which have been processed.

The controller 106 is also connected to receive electrical input from the first microswitch 90 and the second microswitch 92. The controller 106 can detect when either of the microswitches 90, 92 is closed.

Lastly, the controller 106 provides power to the motor 84 via the motor wires 86.

Figure 8:
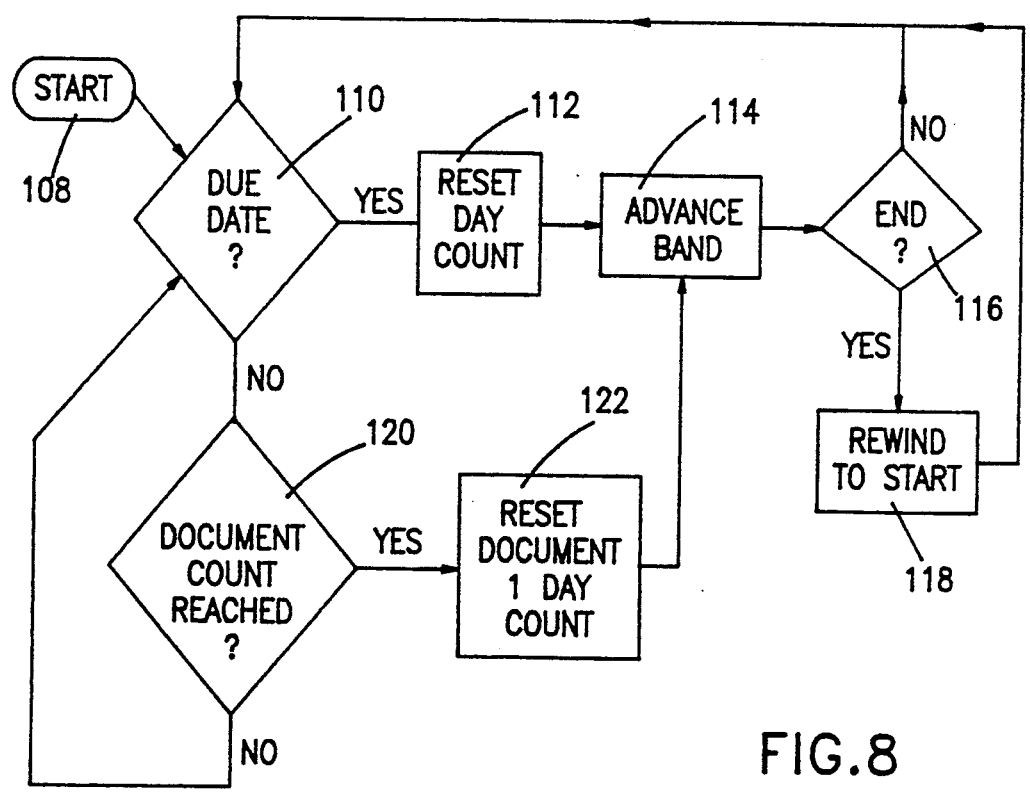
FIG. 8 is a flowchart illustrating the function of the controller of FIG. 7.

FIG. 8 is a flowchart of the activities of the controller 106 in controlling the apparatus of FIG. 6. A start operation 108 is entered whenever the controller is switched on. The start operation passes instantly to a first test 110 which checks to see if the day has come for advancing the discontinuous resilient band 46. The controller 106 retains a count of the number of days since last selection of a fresh portion 52 of the discontinuous resilient band 46. If more than a pre-determined number of days have elapsed, the due date has been reached and the first test 110 passes control to a first operation 112 which resets the day count held by the controller 106. The first operation 112 then passes control to a second operation 114 which advances the band 46 by incrementing the position of the motor 84. The motor 84 increments always unidirectionally. Thus, selectable portions are longitudinally spaced along the band 46 and are selected, in order, unidirectionally moving ever in a direction from one end 54 to the other 54.

The second operation 114 passes control to a second test 116 which checks to see if the second microswitch 92 has been activated. If it has not been activated, the band 46 has not reached an extremity and the second test 116 passes control back to the first test 110. Around this loop, then, if a service date has been reached without a document count having exceeded a pre-determined number, the discontinuous resilient band 46 is advanced without operator intervention.

If the second test 116 detects that the second microswitch 92 has been operated, it means that the discontinuous resilient band 46 has reached an extremity. Control is then passed to a third operation 118 which rewinds the discontinuous resilient band 46 back to its beginning. The controller 106 activates the motor 84 in reverse until it detects closure of the first microswitch 90 showing that the discontinuous resilient band 46 is once more back at its beginning. Control is then passed back to the first test 110 which waits to see the next service interval.

If the first test 110 fails to detect the necessity for advancing the band 46 on the basis of elapsed days, control is passed to a third test 120 which monitors the document count maintained by the controller 106. Every time a document 10 passes between the photosensor 104 and the light source 102, the controller 106 increments a running document count. The discontinuous resilient band must be advanced when a pre-determined count has been reached. If the count has not been reached, the third test 120 passes control back to the first test 110. If the pre-determined document count has been reached, control is passed to a fourth operation 122 which resets both the document and the day count in the controller 106. Fresh counts can then begin, commencing with zero. The fourth operation 122 passes control to the second operation 114 which advances the band, and, as previously described, permits rewinding of the band 46 should it have reached an extremity.

The fourth operation 122, by resetting both the document and day count, provides that the regular advancement of the band 46 by elapse of service periods is put back by advancement of the band 46 with document count. In a variation, the first operation 112 could also be adapted to reset the document count so that advancement of the band 46, in response to document count, should also be subject to the control of the passage of a service advancement of the band on the basis of elapsed time.

For preference, the discontinuous resilient band is formed of material 0.005 centimeters thick and 1.5 centimeters wide, with a length in the region of 10 centimeters. The ends 54 of the discontinuous resilient band 46 are strengthened and rendered perforate by being folded back upon themselves over a distance of 0.75 centimeters and clamped centrally over the folded back portion in a through-penetrating eyelet. The preferred material, depending upon the application and surface hardness of the documents to be processed, can vary from spring steel to resilient phosphor-bronze strips, variously heat treated. Material selection is in the realms of the skilled man. Dependently upon the material chosen, so the distance between the spaced arms 38 of the first preferred embodiment and the band support arms 50 of the second preferred embodiment is also selected.

We claim:

1. An apparatus for urging a document against a reading head by a resilient band, said apparatus comprising: a band support; a moveable resilient band, said band including a plurality of spaced portions along the length thereof, a selected portion being held on said support; and positioning means, operable to position said band to select which portion of said band is said selected portion; said selected portion being operative to urge a document towards the reading head whereby excessive wear of said band is avoided by periodically repositioning said band with said positioning means.

2. An apparatus according to claim 1 wherein said support includes a pair of spaced arms, said selected portion of said band being held there-between.

3. An apparatus according to claim 2 wherein said positioning means includes a motor for moving said band.

4. An apparatus according to claim 3 wherein said band comprises a first end and a second end; wherein said positioning means is operative to take portions, in succession, from said first end to said second end, as said selected portion; said apparatus further comprising sensing means, operative to detect when said second end has been reached and thereafter operative to cause said positioning means to move said band for the selected portion to be once again proximate to said first end.

5. An apparatus according to claim 4 including counting means, operative to count the number of documents which have been engaged by said apparatus and operative to command said positioning means to select a fresh portion of said band whenever a pre-determined number of documents has been exceeded since last selection of a fresh portion.

6. An apparatus according to claim 4 including a controller, operative to calculate the number of days since last selection of a portion of said band and to command said positioning means to select a fresh portion of said band whenever the elapsed time exceeds more than a predetermined number of days.

7. An apparatus according to claim 1 wherein said band is an endless band.

8. An apparatus according to claim 1 wherein said positioning means is manually operable.

* * * * *